United States Patent [19]
Pozek

[11] Patent Number: 6,089,396
[45] Date of Patent: *Jul. 18, 2000

[54] METHOD AND APPARATUS FOR A THEFT RESISTANT FASTENER

[76] Inventor: Juraj Pozek, 11092 Bell Rd., Lemont, Ill. 60439

[*] Notice: This patent is subject to a terminal disclaimer.

[21] Appl. No.: 08/883,667

[22] Filed: Jun. 27, 1997

Related U.S. Application Data

[63] Continuation-in-part of application No. 08/426,081, Apr. 21, 1995, Pat. No. 5,647,253, and application No. PCT/US96/05582, Apr. 19, 1996.

[51] Int. Cl.⁷ .................................................. B65D 45/00
[52] U.S. Cl. ........................... 220/251; 220/284; 81/125; 81/461; 411/402
[58] Field of Search ........................... 220/3.8, 241, 242, 220/284, 243, 244, 245, 251, 314; 411/402; 81/121.1, 442, 448, 456, 460, 461, 176.1–176.15, 125, 124.2

[56] References Cited

U.S. PATENT DOCUMENTS

| | | | |
|---|---|---|---|
| 2,156,166 | 4/1939 | Smith | 220/243 |
| 2,550,751 | 5/1951 | Adams | 220/245 X |
| 2,760,670 | 8/1956 | Moore | 220/245 |
| 3,084,827 | 4/1963 | Dyer | 220/251 |
| 3,550,637 | 12/1970 | Briden | 220/245 X |
| 4,059,199 | 11/1977 | Quaney | 220/3.8 |
| 4,914,258 | 4/1990 | Jackson | 220/251 X |
| 5,647,253 | 7/1997 | Pozek | 81/125 |

*Primary Examiner*—Stephen K. Cronin
*Attorney, Agent, or Firm*—Michael R. McKenna

[57] ABSTRACT

This invention relates to a method and apparatus for fastening two members together with a theft resistant screw having a head with a top surface which is free of any engageable indentations or protrusions, with an independent tool means to drive the screw.

18 Claims, 6 Drawing Sheets

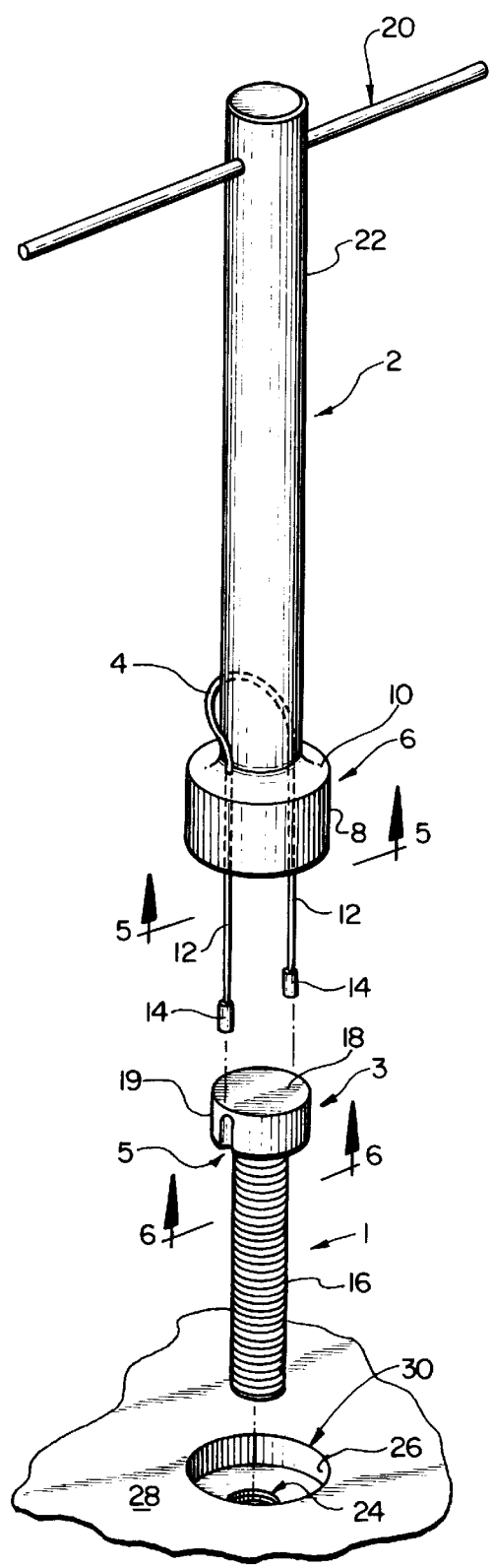
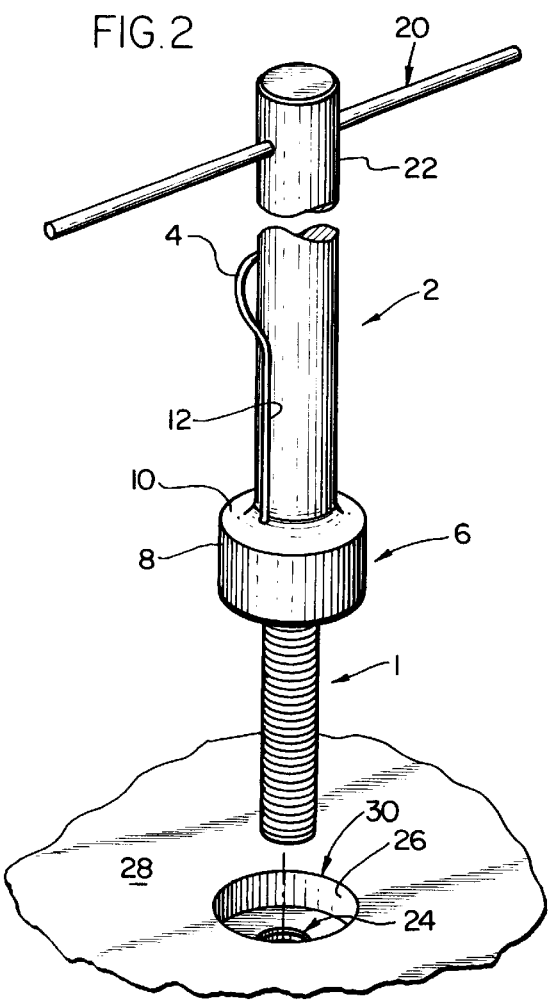
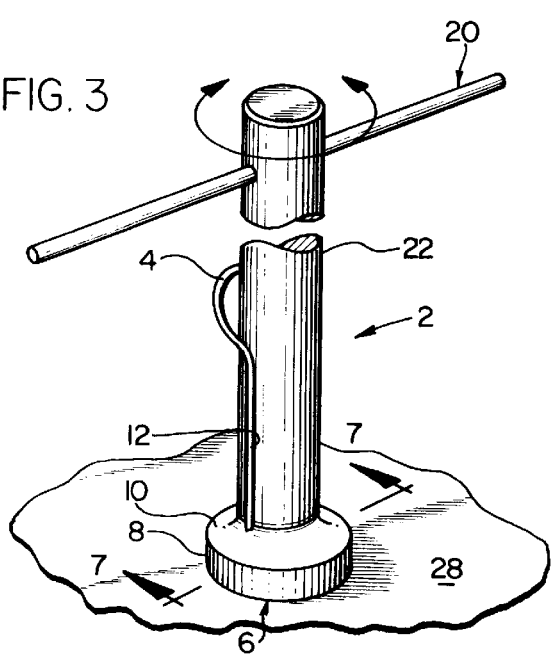

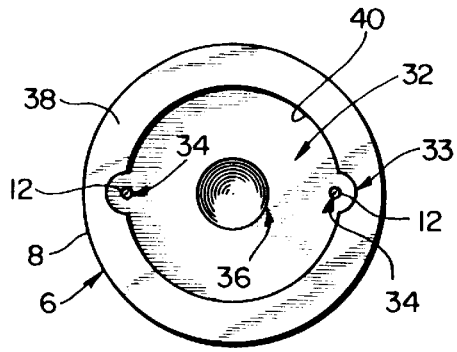
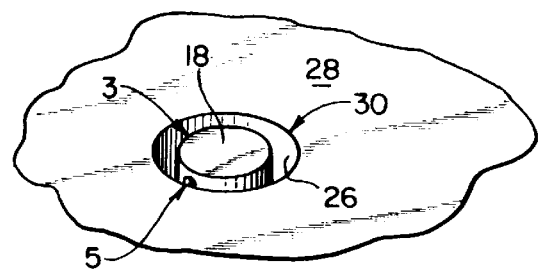
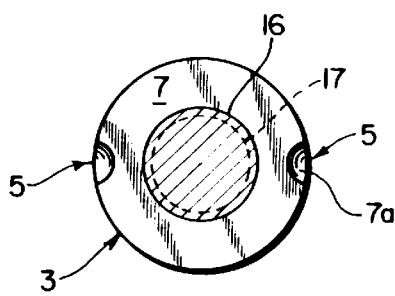
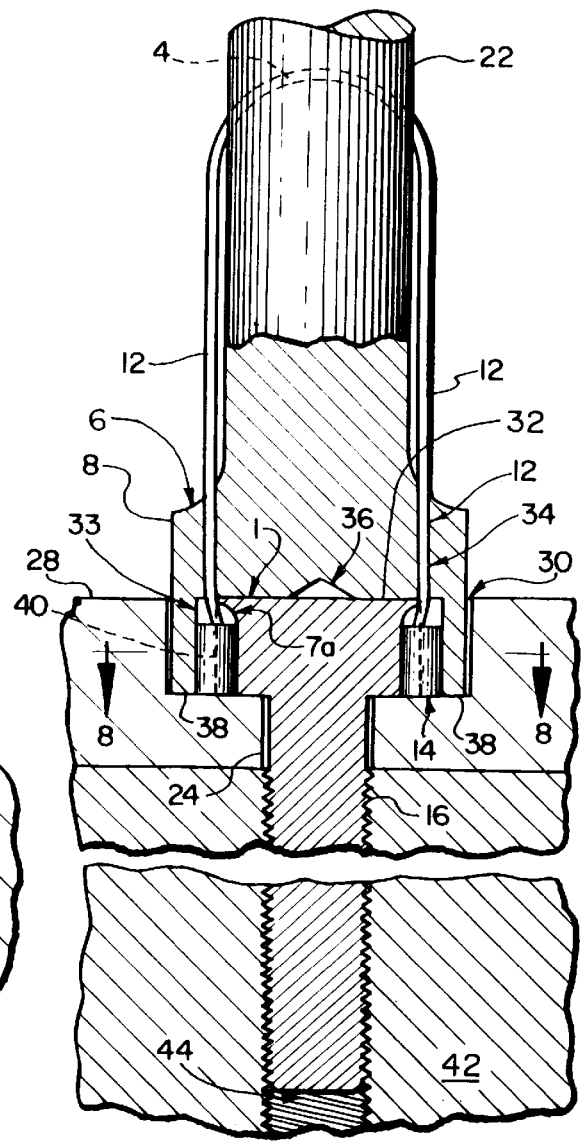
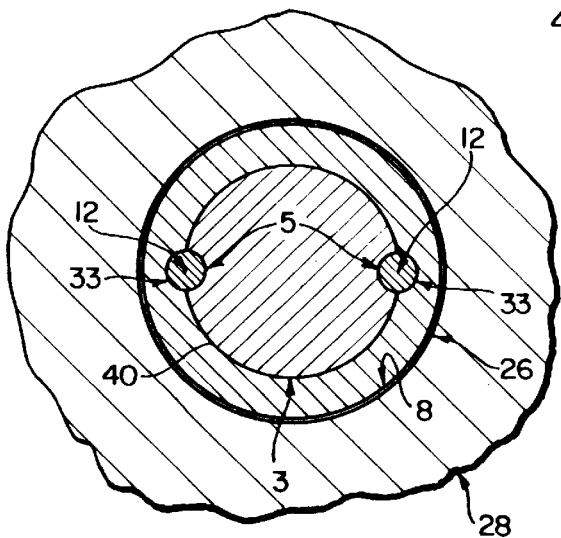

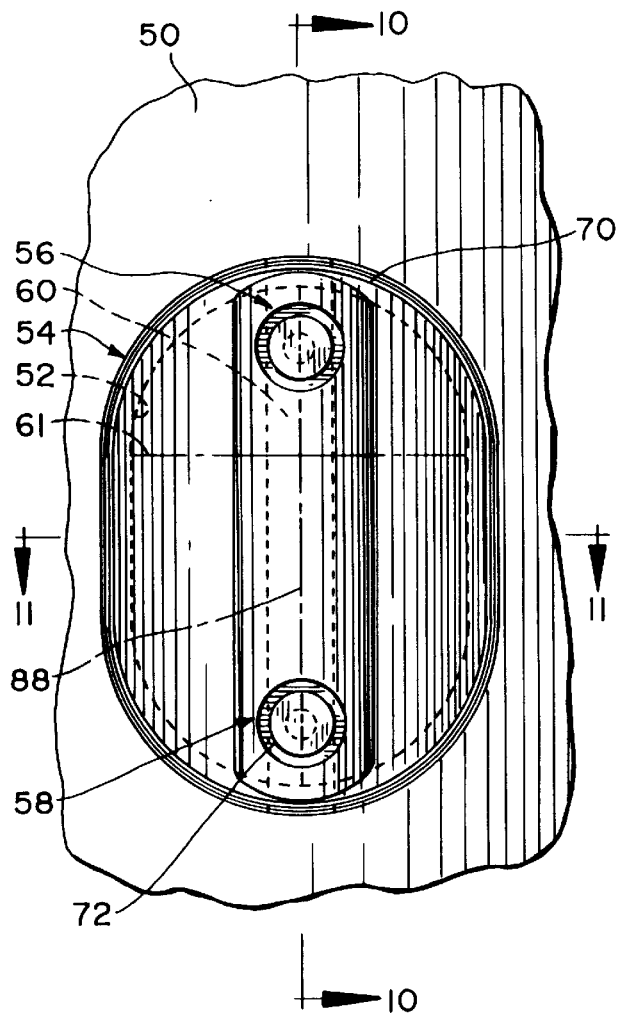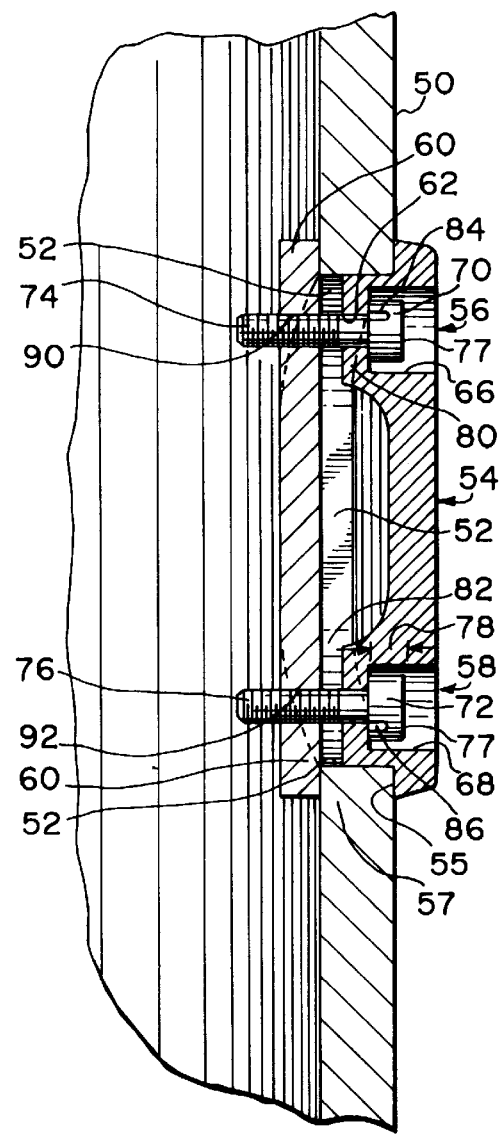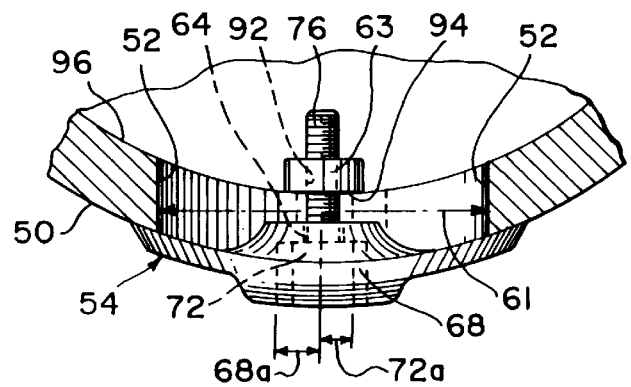

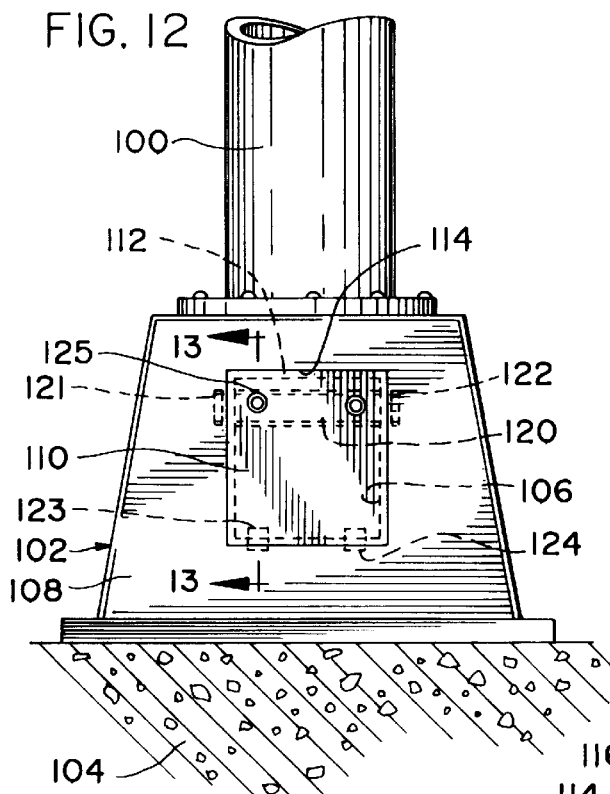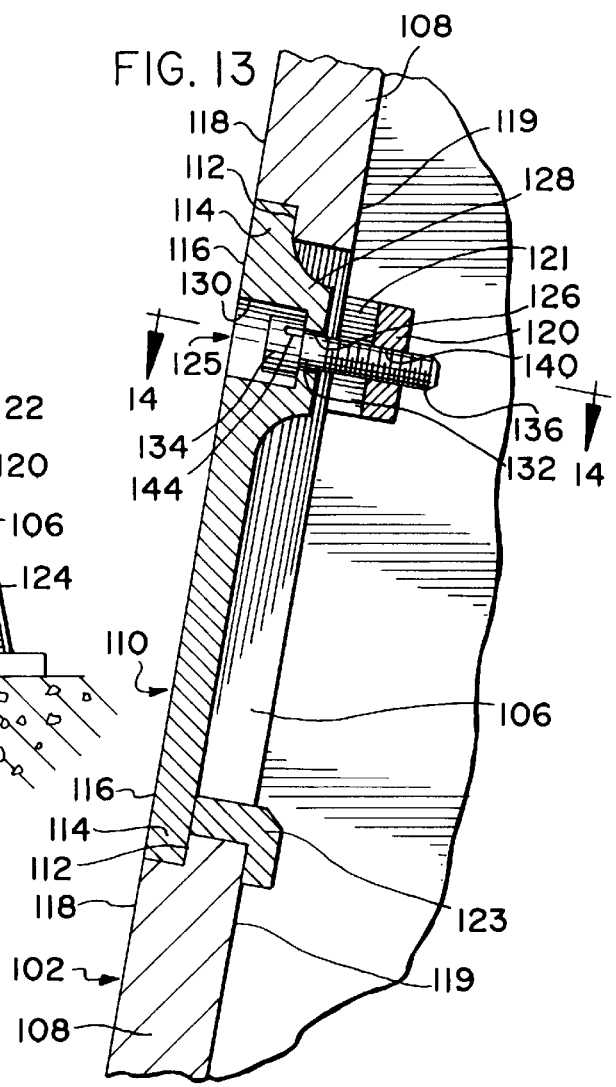

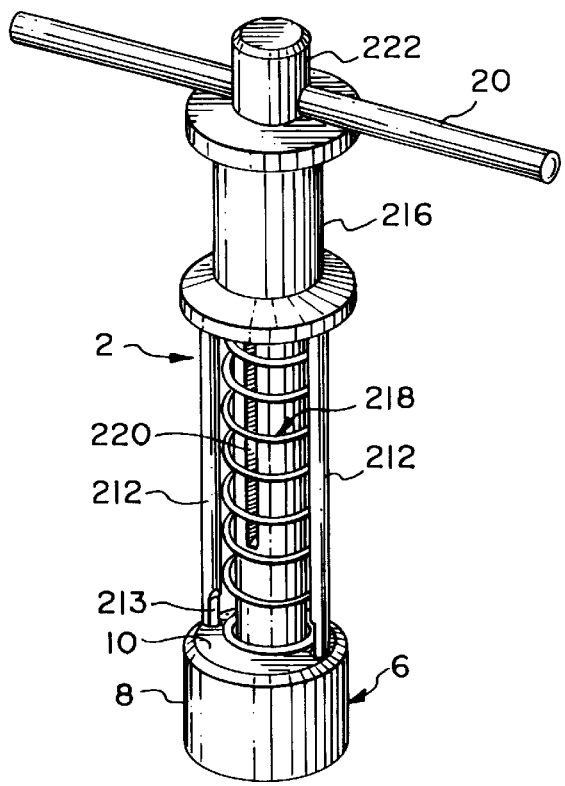
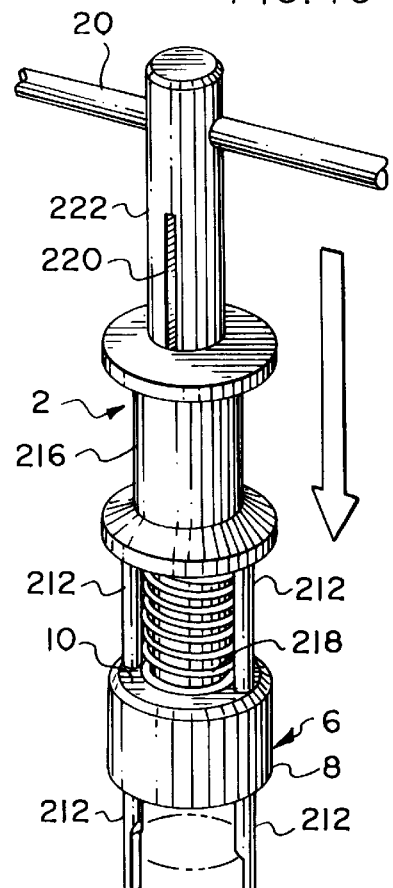
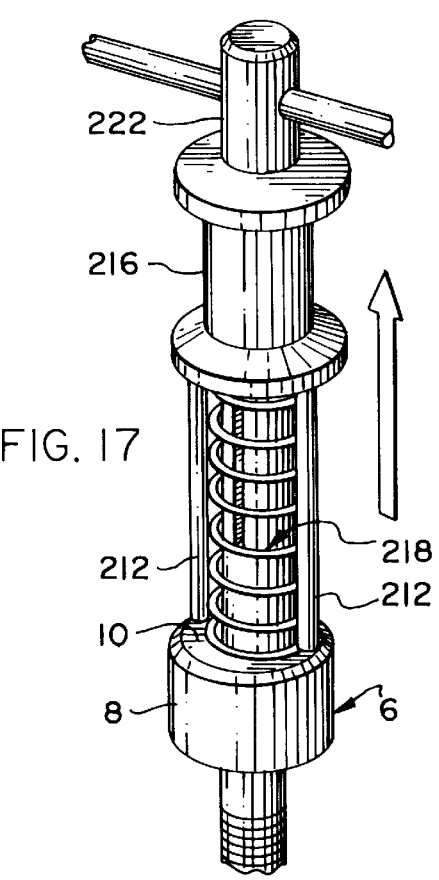
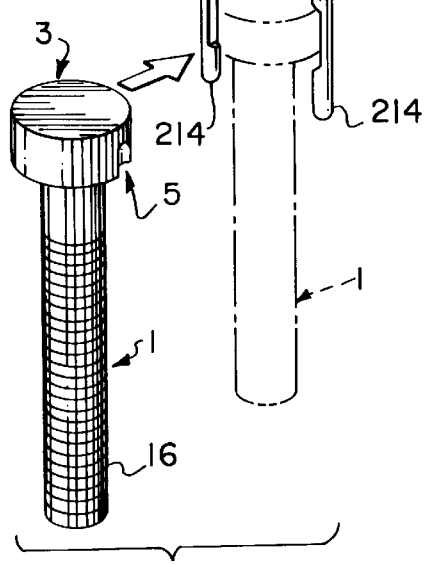
FIG. 15
FIG. 16
FIG. 17

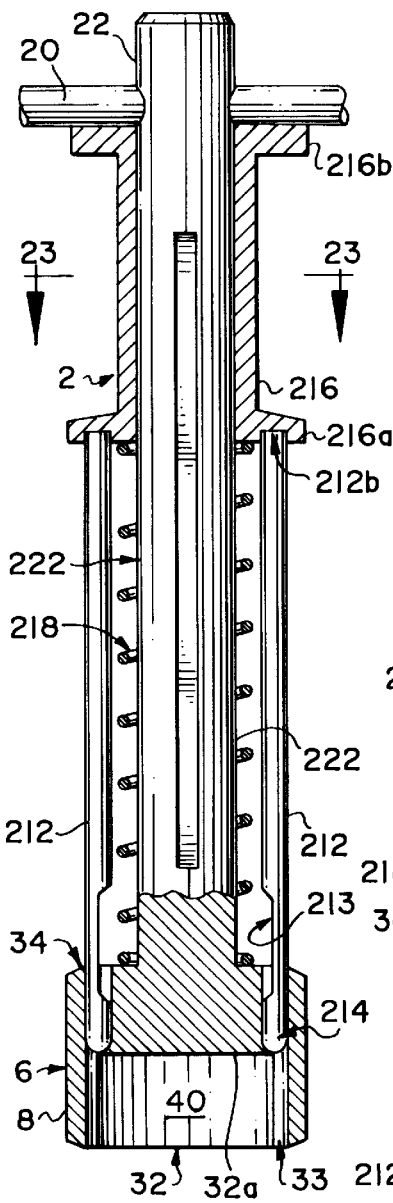
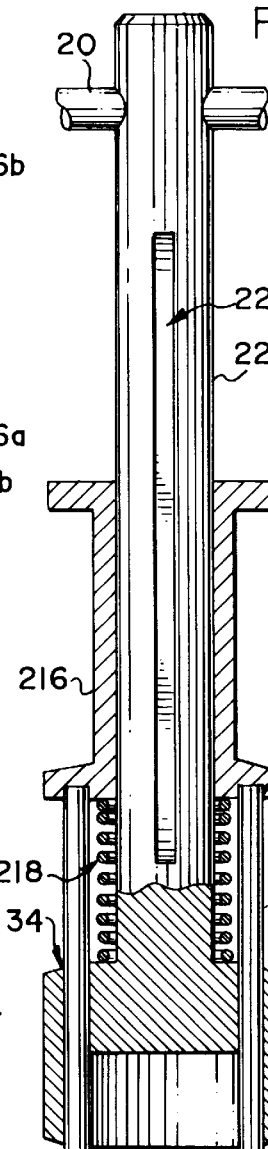
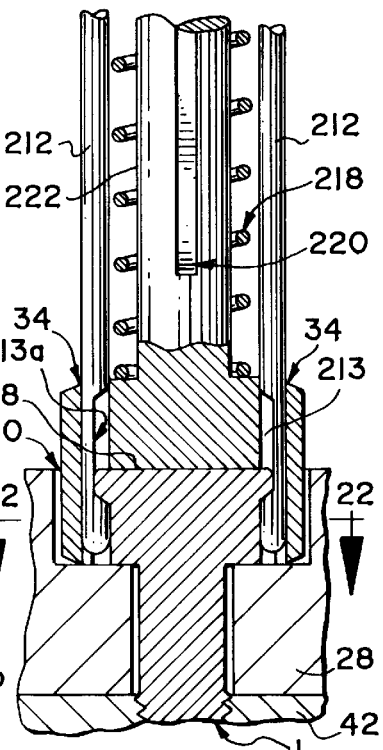
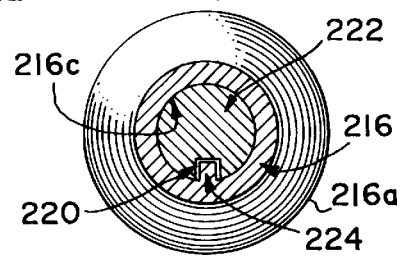
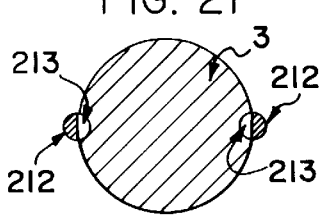
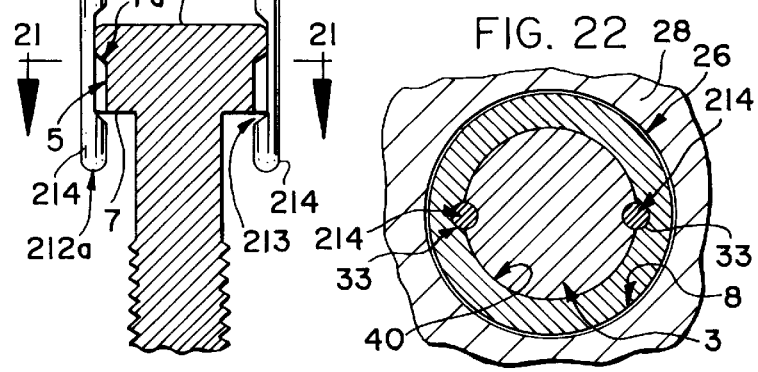

METHOD AND APPARATUS FOR A THEFT RESISTANT FASTENER

The applicant claims the benefit of the following prior filed copending applications, by the same inventor and designating the United States of America: U.S. Ser. No: 08/426,081, Filed: Apr. 21, 1995 and International Application No. PCT/US96/05582; International Filing Date: Apr. 19, 1996. This application is a Continuation-In-Part application of the above referenced prior applications.

FIELD OF INVENTION

This invention relates to a method and apparatus for a theft resistant fastener which can be used to fasten one member to another member, as for example to fasten a cover plate to a base member.

BACKGROUND OF THE INVENTION

Alternative technology is available in the form of U.S. Pat. No. 1,300,275 issued to Johnson in April, 1919 which reveals a combination of a screw having a single hole eccentric with respect to the axis of the screw and a removable driving key having an eccentric pin adapted to enter the full length of said screw. Unlike the present invention, a hole is exposed relative to the head of the screw.

U.S. Pat. No. 4,569,259 issued to Rubin et al. on Feb. 11, 1986 discloses an automobile wheel cover locking bolt and wrench combination wherein the head of the locking bolt has a plurality of axial slots, or lock impressions, about its periphery which may be spaced in accordance with a preselected code. The wrench socket is provided with a corresponding number of key elements projecting inwardly from the cylindrical wall of the socket, the position of the key elements being in accordance with a matching preselected code. Additionally, the head of the locking bolt has an axial recess and the socket of the wrench has an axial pin adapted to align and fit within the recess of the bolt. All of the recesses are visible from the top plane view of the bolt.

U.S. Pat. No. 2,372,269 issued to Golan on Mar. 27, 1945, relates to a socket wrench and cooperating theft resistant nut with fully extending slots and grooves.

A brake tool disclosed in U.S. Pat. No. 5,003,681 by Schley in 1991 reveals a disc like tool having a pin disposed to engage a depression in the surface of a piston.

An anti-theft apparatus including a screw with an anti-theft safety head is disclosed in U.S. Pat. No. 4,964,773 dated Oct. 23, 1990 issued to Schmidt. The disclosed device is for a screw with an extended head that is arranged and adapted to support a locking device which may freely rotate if not set in a locking position. Thus, the head freely rotates relative to the screw preventing the screw from being removed unless the head is first locked thereto. Unlike the present invention, the head is not removable, but merely rotatable about the screw and the structure disclosed is considerably different.

A patent issued to Burge on Jun. 7, 1977, U.S. Pat. No. 4,027,572 reveals a theft resistant screw fastener with both the tool and the nut having axial recesses which accommodate a dowel arranged and adapted to have one of its ends disposed in the recess of the nut and the other in the recess of the tool.

Some of the drawbacks to these designs are that each teaches fasteners that are more readily removable by theft since indentations which can be easily grasped are exposed. Moreover, none of the foregoing inventions is designed to be theft resistant in a surface recess (i.e. a countersunk borehole sized to accommodate the socket body of the wrench).

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

ADVANTAGES OF THIS INVENTION

To alleviate this problem, and others which will become apparent from the disclosure which follows, the present invention conveniently provides a method and apparatus for fastening a theft resistant screw having a head with a top surface that is free of any engageable indentations or engageable protrusions with an independent means to drive the screw.

The independent means to drive the screw is provided in terms of a wrench having a socket and a movable plug that fits into a cavity created by the alignment of a recess in the outer cylindrical wall of the screw head and a socket recess in the inner wall of the socket. Whereby, a plug engaged in the recess of the inner wall of the socket acts as a means to drive a cylindrical headed screw having a complementary recess disposed in an outer wall of the cylindrical head.

An advantage is revealed in a preferred embodiment of the movable plug of the invention which reveals an elongated plug whose thickness is less than the distance between the inner wall and the outer wall of the socket body. This facilitates the removal of the plug from a countersunk borehole in the first of two members that are to be fastened together. In instances where the countersunk borehole (for example, in a cover plate or other article to be fastened to a second member) is sized only nominally larger than the socket body and the head of the screw is only nominally smaller than the inner wall of the socket, then the plugs must necessarily be of limited thickness, otherwise it will not be possible to remove the plug from the cavity defined by the wall of the countersunk borehole when the screw is fully fastened in said borehole.

In a preferred mode, the head diameter of the screw and socket body diameter would be engineered to minimize the wall thickness of the side wall of the socket, and thus limit the thickness of the plugs. This would inhibit theft of a screw imbedded in a surface with a countersunk borehole slightly larger than the outer diameter of the socket body, as the limited distance between the head and the outer wall of the countersunk hole would limit access to an extraneous tool.

Still other advantages will be apparent from the disclosure that follows.

SUMMARY OF THE INVENTION

The invention relates to a method and apparatus for a theft resistant fastener for fastening two members together comprising a screw having a shank and a generally cylindrical head disposed concentrically on an end of the shank. The generally cylindrical head has an outer side wall with an upper edge and a lower edge. The lower edge is proximate to the shank and the outer side wall has at least one recess extending longitudinally from its lower edge to a spaced distance from its upper edge. An independent means to drive the screw is further provided.

The independent means comprises an elongated wrench having an axially disposed socket at one end. The socket has an inner cylindrical wall with at least one recess disposed longitudinally. The wrench further comprises at least one detachable plug suitably sized and adapted to engage the recess disposed longitudinally along the inner cylindrical wall and a means for tethering each detachable plug to the wrench. Each of the detachable plugs is movable between a first position, in which the detachable plug is disposed within the socket where it may engage the recess disposed longitudinally along the inner cylindrical wall thereof, and a second position, in which the detachable plug is disposed outside of the socket.

One embodiment of the fastener is specifically designed to fasten a cover plate for an aperture in a wall to a retaining bar located behind the wall, with the wall grasped tightly between the cover plate and retaining bar.

BRIEF DESCRIPTION OF THE DRAWINGS

Preferred embodiments of the invention are described hereinafter with reference to the accompanying drawing wherein:

FIG. 1 is an exploded perspective view of a first preferred embodiment of the apparatus for a theft resistant fastener of the present invention showing a wrench having a socket disposed on one end with two moveable plugs extending outside of the socket which plugs can be engaged to the longitudinal recesses shown in the outer cylindrical wall of the head of a screw shown prior to fastening.

FIG. 2 is a perspective view of the first preferred embodiment of the apparatus for a theft resistant fastener of the present invention showing the threaded shank of the screw exposed from the socket of the wrench and with the moveable plug actuator having been drawn away from the socket forcing the plugs into engagement with the socket and screw head.

FIG. 3 is a perspective view of the first preferred embodiment of the apparatus for a theft resistant fastener of the present invention showing the socket of the wrench partially disposed within the borehole of the cover.

FIG. 4 is a perspective view of the first preferred embodiment of the apparatus for a theft resistant fastener of the present invention showing the head of the screw disposed in the borehole of the cover.

FIG. 5 is a cross-section view taken along line 5—5 of FIG. 1, showing the cylindrical shape of the outer wall of the socket, the generally cylindrical shape and longitudinal recesses of the inner wall of the socket, and the sleeve for the cable to be guided through.

FIG. 6 is a cross-section view taken along line 6—6 of FIG. 1, showing the generally cylindrical shape and longitudinal recesses of the outer wall of the head of the screw.

FIG. 7 is a cross-section view taken along line 7—7 of FIG. 3, showing the shank of a screw disposed through the cover plate and in threaded engagement with a base to which the cover plate is fastened, the plugs disposed in a cavities formed by the alignment of the recesses in the inner cylindrical wall of the socket and the corresponding recesses in the outer side wall of the head of the screw, the terminus of the recess in the outer side wall of the head of the screw at a spaced distance from its upper edge, the screw head disposed in the socket, and the socket body disposed in the borehole of the cover plate.

FIG. 8 is a cross-section view taken along line 8—8 of FIG. 7, showing in plan view the plugs disposed in the cavity formed by the alignment of the recess in the inner cylindrical wall of the socket and the recess in the outer side wall of the head of the screw, the relationship between the diameter of the screw head and the socket in which it is disposed, and the relationship between the diameter of the outer cylindrical wall of the socket body and the borehole of the cover plate in which it is disposed.

FIG. 9 is a front elevation view of the theft resistant fastener of this invention used to secure a cover plate over an aperture in the side wall of a hollow lamp post.

FIG. 10 is a cross-section view taken along line 10—10 in FIG. 9.

FIG. 11 is a cross-section view taken along line 11—11 in FIG. 9.

FIG. 12 is a front elevation view of another embodiment of the apparatus of this invention showing a cover plate over an aperture in the wall of a hollow pedestal that supports a hollow lamp post.

FIG. 13 is a cross-section view taken along line 13—13 in FIG. 12.

FIG. 14 is a cross-section view taken along line 14—14 in FIG. 13.

FIG. 15 is a perspective view of a second preferred embodiment of the apparatus for a theft resistant fastener of the present invention showing a collar member of the means for actuating spring biasedly disposed against the handle extension.

FIG. 16 is an exploded perspective view of the second preferred embodiment of the apparatus for a theft resistant fastener of the present invention with the actuated movement of the collar member shown by the arrow to expose the free end of the elongated rods to a position where the plugs can engage the recesses in the outer side wall of the screw head, said independent screw being shown separated from the wrench and attached to the wrench, in phantom.

FIG. 17 is a perspective view of the second preferred embodiment of the apparatus for a theft resistant fastener of the present invention with the spring biased movement of the collar member shown by the arrow to draw the means for plugging and the screw attached into locking engagement with the socket.

FIG. 18 is a fragmentary cross-sectional side elevation view of the second preferred embodiment of the apparatus for a theft resistant fastener of the present invention showing the wrench with the collar member spring biased against the handle extension and the position of the plugs in the socket body.

FIG. 19 is a fragmentary cross-sectional side elevation view of the second preferred embodiment of the apparatus for a theft resistant fastener of the present invention showing the wrench with the collar member actuated to position the plugs of the elongated rods outside of the socket body to engage the screw.

FIG. 20 is a fragmentary view of the second preferred embodiment of the apparatus for a theft resistant fastener of the present invention showing the screw head engaged by the plugs within the socket body of the wrench.

FIG. 21 is a cross sectional view taken along line 21—21 of FIG. 19 showing the relationship between the recesses in the screw head and the elongated rod.

FIG. 22 is a cross sectional view taken along line 22—22 of FIG. 20 showing a plan view of the plugs disposed in the cavity formed by the alignment of the inner cylindrical wall of the socket and the recess in the outer side wall of the head of the screw, the relationship between the diameter of the screw head and the socket in which it is disposed, and the relationship between the diameter of the outer cylindrical wall of the socket body and the borehole of the cover plate in which it is disposed.

FIG. 23 is a cross sectional view taken along the line 23—23 of FIG. 18 showing the collar member disposed around the shaft with the nub of the collar member disposed in the notch of the handle.

DETAILED DESCRIPTION OF THE INVENTION

The preferred embodiments depicted in the drawing include an apparatus for a theft resistant fastener for fastening two members together comprising a screw 1 having a shank and a generally cylindrical head 3 disposed concentrically on an end of the shank. The generally cylindrical head 3 has a top surface 18 with a peripheral edge, a bottom surface 7 with a peripheral edge, the bottom surface 7 is disposed proximate to the shank, and an outer side wall with an upper edge and a lower edge, the top surface 18 having its peripheral edge connected to the upper edge of the outer side wall and the bottom surface 7 having its peripheral edge connected to the lower edge of the outer side wall, and the outer side wall has at least one recess 5 extending longitudinally from its lower edge to a spaced distance from its upper edge. The top of the recess 7a is shown in FIG. 6. It is designed to be used with a removable tool which is described below.

As one example of two members that can be fastened together with the method and apparatus of this invention, the accompanying drawing shows a cover plate 28 (FIGS. 1–4, 7 and 8) fastened to a base 42 (FIG. 7). It will be understood, of course, that this invention will be useful in fastening together any appropriate types of articles or members.

Without departing from the generality of the invention disclosed herein, the screw 1 of the apparatus could easily have a head 3 of varying configurations that could not easily be removed without a complementary, mating tool. The discussion that follows, without limiting the scope of the invention, will refer to the invention as depicted in the drawing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

A preferred embodiment of the screw 1 of the invention is shown in FIG. 1. It shows an apparatus for a theft resistant fastener comprising a screw 1 having a shank and a generally cylindrical head 3 disposed concentrically on an end of said shank. The generally cylindrical head 3 has an outer side wall with an upper edge and a lower edge. The lower edge is proximate to the shank and the outer side wall has at least one recess 5 extending longitudinally from its lower edge to a spaced distance from its upper edge.

A preferred feature of the screw 1 of the invention teaches a top surface 18 of the head 3 which is free of any engageable indentations or engageable protrusions.

The apparatus for a theft resistant fastener further provides for an independent means to drive the screw 1. One such preferred embodiment of the means to drive the screw 1 is a wrench 2 having a screw head-receiving socket 32 (best seen in FIGS. 5, 7 and 8).

Modifications will be obvious to those skilled in the art. As shown in FIG. 1, the wrench has a handle 22 and a handle extension 20 to facilitate rotation. FIG. 7 shows an axial tooling recess 36 in the upper wall of the socket.

A preferred embodiment of the wrench 2 of this important invention comprises a wrench 2 having a socket 32, where the socket 32 is defined by an upper surface having a peripheral edge and an inner wall 40 having an upper edge connected to the peripheral edge of the upper surface. The inner wall 40 has at least one socket recess 33 disposed longitudinally. Additionally, the wrench 2 further comprises a movable plug 14 suitably sized and shaped to engage one of the socket recesses 33 disposed longitudinally along the inner wall 40. As depicted in FIG. 5, the inner wall 40 of the socket 32 is generally cylindrical.

The socket 32 has a socket body 6 having an outer wall 8 with an upper edge and a top 10 with a peripheral edge; the upper edge of the outer wall 8 being connected to the peripheral edge of the top 10. As shown in FIGS. 1 and 2, the outer wall 8 of the socket body 6 is generally cylindrical in its preferred form. The bottom rim 38 of the socket body 6 is shown in FIG. 5.

Referring to FIG. 5, the socket 32 is defined by an upper surface having a peripheral edge and an inner wall 40 having an upper edge connected to the peripheral edge of the upper surface. The inner wall 40 has a plurality of socket recesses 33 disposed longitudinally. Referring to FIG. 1, the wrench 2 further comprises a corresponding number of movable plugs 14, each being suitably sized and shaped to engage one of the socket recesses 33 disposed longitudinally along the inner wall 40, as shown in FIG. 8.

The wrench 2 may further comprise a means for tethering each movable plug 14 to the wrench 2. The means for tethering each movable plug 14 to the wrench 2 may allow each movable plug 14 to move between a first position, in which the movable plug 14 is disposed within the socket 32 where it may engage the socket recess 33 disposed longitudinally along the inner wall 40 thereof, and a second position, in which the movable plug 14 is disposed outside of the socket 32.

As shown in the drawing, a preferred embodiment of the means for tethering each movable plug 14 may comprise a flexible cable 12 and wherein the socket body 6 has a means for guiding the cable. As best shown in FIG. 7, the top of the socket body 6 has a means for guiding the cable. The cable 12 is routed through the guide means and has a proximate end attached to the movable plug 14 and a distal end that is disposed outside the socket body 6 proximate to the top thereof. As shown in FIG. 7, the guide means may comprise a sleeve 34 for each cable 12. The distal end of the cable 12 is manually actuable to move the plug 14 between its first and second positions. Such distal end may be configured, as shown in FIGS. 1, 2 and 3 to extend the cable 12 into a loop to serve as a cable actuator 4.

A preferred embodiment of the movable plug 14 of the invention reveals an elongated plug 14 whose thickness is less than the distance between the inner wall 40 and the outer wall 8 of the socket body 6. This facilitates the removal of the plug 14 from a countersunk borehole 30. In instances where the countersunk borehole 30 of a cover plate 28 or other article is sized only nominally larger than the socket body 6 and the head 3 of the screw 1 is only nominally smaller than the inner wall 40 of the socket 32, then the plugs 14 must necessarily be of limited thickness, otherwise it will not be possible to remove the plug 14 from the cavity defined by the wall 29 of the countersunk borehole 30 when the screw 1 is fully fastened in said borehole. In a preferred mode, the head diameter of the screw and socket body diameter would be engineered to minimize the wall thickness of the side wall of the socket, and thus limit the thickness of the plugs. This would inhibit theft of a screw imbedded in a surface with a countersunk borehole slightly larger than the outer diameter of the socket body, as the limited distance between the head and the outer wall of the countersunk hole would limit access to an extraneous tool.

Where the screw 1 has its recess 5 extending along the entire length of the outer wall 8 of the head, the thickness of the plug 14 may be larger in lateral dimension. Another preferred embodiment of the screw 1 provides that the head 3 has an outer side wall with at least one recess 5 extending longitudinally along the length thereof.

As shown in FIGS. 1 and 7, the plugs 14 and socket 32 of the wrench 2 attach to the screw 1 disclosed. As pointed out above, an exemplary use of the method and apparatus of this invention—to fasten a cover plate 28 to a base 42—is also disclosed in FIG. 7.

An embodiment of the method for producing a theft resistant fastening of a first member to a second member comprises the following steps: a. moving a moveable plug 14 of a wrench 2 having a socket body 6 with a socket 32 that has an inner wall 40 that has a socket recess 33 disposed longitudinally, to a position in which the movable plugs 14 are disposed outside of the socket; b. engaging the movable plug 14 disposed outside of the socket to the recess 5 extending longitudinally along an outer wall 8 of a generally cylindrical head 3 of a screw 1 that has a threaded shank 16, the generally cylindrical head 3 has a top surface 18 with a peripheral edge, a bottom surface 7 with a peripheral edge, the bottom surface 7 is disposed proximate to the shank, and an outer side wall with an upper edge and a lower edge, the top surface 18 having its peripheral edge connected to the upper edge of the outer side wall and the bottom surface 7 having its peripheral edge connected to the lower edge of the outer side wall, and each of the recesses 5 extends longitudinally from its lower edge to a spaced distance from its upper edge; c. positioning the socket recess 33 on the inner wall 40 of the socket in alignment with the engaged plug 14 disposed along the recess 5 of the outer wall 8 of the head 3 of the screw 1; and d. bringing together the cylindrical head 3 of the screw 1 with the plug 14 engaged thereto and the socket, permitting the engaged plug 14 to be disposed in the socket recess 33 disposed longitudinally along the inner wall 40 of the socket.

In another embodiment of the method for a theft resistant fastener of the present invention the following steps are provided: a. moving a moveable plug 14 of a wrench 2 having a socket body 6 with a socket that has an inner wall 40 that has a socket recess 33 disposed longitudinally, to a position, in which the movable plugs 14 are disposed outside of the socket; b. engaging the movable plug 14 disposed outside of the socket to the recess 5 extending longitudinally along an outer wall 8 of a generally cylindrical head 3 of a screw 1 that has a threaded shank 16, the generally cylindrical head 3 has a top surface 18 with a peripheral edge, a bottom surface 7 with a peripheral edge, the bottom surface 7 is disposed proximate to the shank, and an outer side wall with an upper edge and a lower edge, the top surface 18 having its peripheral edge connected to the upper edge of the outer side wall and the bottom surface 7 having its peripheral edge connected to the lower edge of the outer side wall, and each of the recesses extends longitudinally from its lower edge to a spaced distance from its upper edge; c. positioning the socket recess 33 on the inner wall 40 of the socket in alignment with the engaged plug 14 disposed along the recess 5 of the outer wall 8 of the head 3 of the screw 1; d. bringing together the cylindrical head 3 of the screw 1 with the plug 14 engaged thereto and the socket, permitting the engaged plug 14 to be disposed in the socket recess 33 disposed longitudinally along the inner wall 40 of the socket; e. positioning the threaded end of the shank of the screw 1 through a bore having a countersunk borehole 30 of sufficient diameter to accommodate the socket body 6 and of axial length greater than the length of the recess 5 extending along the outer wall 8 of the generally cylindrical head 3 of the screw 1.

Another preferred embodiment of the method of this invention of the present invention comprises the following steps: a. moving a moveable plug 14 of a wrench 2 having a socket body 6 with a socket that has an inner wall 40 that has a socket recess 33 disposed longitudinally, to a position, in which the movable plugs 14 are disposed outside of the socket; b. engaging the movable plug 14 disposed outside of the socket to the recess 5 extending longitudinally along an outer wall 8 of a generally cylindrical head 3 of a screw 1 that has a threaded shank, the generally cylindrical head 3 has a top surface 18 with a peripheral edge, a bottom surface 7 with a peripheral edge, the bottom surface 7 is disposed proximate to the shank, and an outer side wall with an upper edge and a lower edge, the top surface 18 having its peripheral edge connected to the upper edge of the outer side wall and the bottom surface 7 having its peripheral edge connected to the lower edge of the outer side wall, and each of the recesses extends longitudinally from its lower edge to a spaced distance from its upper edge; c. positioning the socket recess 33 on the inner wall 40 of the socket in alignment with the engaged plug 14 disposed along the recess 5 of the outer wall 8 of the head 3 of the screw 1; d. bringing together the cylindrical head 3 of the screw 1 with the plug 14 engaged thereto and the socket, permitting the engaged plug 14 to be disposed in the socket recess 33 disposed longitudinally along the inner wall 40 of the socket; e. positioning the threaded end of the shank of the screw 1 through a bore having a countersunk borehole 30 of sufficient diameter to accommodate the socket body 6 and of axial length greater than the length of the recess 5 extending along the outer wall 8 of the generally cylindrical head 3 of the screw 1; f. driving the screw 1 into threaded engagement with a threaded bore 44 of a base 42, thereby securing the screw 1 and cover plate 28 to the base 42; g. axially withdrawing the socket of the wrench 2 from the countersunk borehole 30 of the cover plate 28, allowing the engaged plug 14 to remain engaged to the recess 5 of the head 3 of the screw 1; and h. freeing the moveable plug 14 from the recess 5 of the head 3 of the screw 1 and withdrawing the moveable plug 14 of the wrench 2 from the countersunk borehole 30 of the cover plate 28, thereby disengaging the wrench 2 from the screw 1.

In another preferred embodiment of the method for a theft resistant fastener the following steps are provided: a. moving each of a plurality of moveable plugs 14 of a wrench 2 having a socket body 6 with a socket that has an inner wall 40 that has a corresponding number of socket recesses 33 disposed longitudinally, to a position, in which the movable plugs 14 are disposed outside of the socket; b. engaging each of the movable plugs 14 disposed outside of the socket to a recess 5 extending longitudinally along an outer wall 8 of a generally cylindrical head 3 of a screw 1 that has a threaded shank, the generally cylindrical head 3 has a top surface 18 with a peripheral edge, a bottom surface 7 with a peripheral edge, the bottom surface 7 is disposed proximate to the shank, and an outer side wall with an upper edge and a lower edge, the top surface 18 having its peripheral edge connected to the upper edge of the outer side wall and the bottom surface 7 having its peripheral edge connected to the lower edge of the outer side wall, and each of the recesses extends longitudinally from its lower edge to a spaced distance from its upper edge; c. positioning the socket recesses 33 on the inner wall 40 of the socket in alignment with the engaged plugs 14 disposed along the recesses of the outer wall 8 of the head 3 of the screw 1; and d. bringing together the cylindrical head 3 of the screw 1 with the plugs 14 engaged thereto and the socket, permitting the engaged plugs 14 to be disposed in the socket recesses 33 disposed longitudinally along the inner wall 40 of the socket.

Another embodiment of the method of the present invention comprises the following steps: a. moving a moveable plug 14 of a wrench 2 having a socket body 6 with a socket that has an inner wall 40 that has a socket recess 33 disposed longitudinally, to a position in which the movable plugs 14 are disposed outside of the socket; b. engaging the movable plug 14 disposed outside of the socket to the recess 5 extending longitudinally along an outer wall 8 of a generally cylindrical head 3 of a screw 1 that has a threaded shank, the generally cylindrical head 3 has a top surface 18 with a peripheral edge, a bottom surface 7 with a peripheral edge, the bottom surface 7 is disposed proximate to the shank, and an outer side wall with an upper edge and a lower edge, the top surface 18 having its peripheral edge connected to the upper edge of the outer side wall and the bottom surface 7 having its peripheral edge connected to the lower edge of the outer side wall, and each of the recesses extends longitudinally from its lower edge to a spaced distance from its upper edge; c. positioning the socket recess 33 on the inner wall 40 of the socket in alignment with the engaged plug 14 disposed along the recess 5 of the outer wall 8 of the head 3 of the screw 1; d. bringing together the cylindrical head 3 of the screw 1 with the plug 14 engaged thereto and the socket, permitting the engaged plug 14 to be disposed in the socket recess 33 disposed longitudinally along the inner wall 40 of the socket; e. positioning the threaded end of the shank of the screw 1 through a bore having a countersunk borehole 30 of sufficient diameter to accommodate the socket body 6 and of axial length greater than the length of the recess 5 extending along the outer wall 8 of the generally cylindrical head 3 of the screw 1; f. driving the screw 1 into threaded engagement with a threaded bore 44 of a base 42, thereby securing the screw 1 and cover plate 28 to the base 42; g. axially withdrawing the socket of the wrench 2 from the countersunk borehole 30 of the cover plate 28, allowing the engaged plug 14 to remain engaged to the recess 5 of the head 3 of the screw 1; and h. freeing the moveable plug 14 from the recess 5 of the head 3 of the screw 1 and withstanding the moveable plug 14 of the wrench 2 from the countersunk borehole 30 of the cover plate 28, thereby disengaging the wrench 2 from the screw 1.

Another preferred method of the present invention, which can be easily visualized by reference to the drawing, comprises the following steps: a. moving each of a plurality of moveable plugs 14 of a wrench 2 having a socket body 6 with a socket that has an inner wall 40 that has a corresponding number of socket recesses 33 disposed longitudinally, to a position in which the movable plugs 14 are disposed outside of the socket; b. engaging each of the movable plugs 14 disposed outside of the socket to a recess 5 extending longitudinally along an outer wall 8 of a generally cylindrical head 3 of a screw 1 that has a threaded shank, the generally cylindrical head 3 has a top surface 18 with a peripheral edge, a bottom surface 7 with a peripheral edge, the bottom surface 7 is disposed proximate to the shank, and an outer side wall with an upper edge and a lower edge, the top surface 18 having its peripheral edge connected to the upper edge of the outer side wall and the bottom surface 7 having its peripheral edge connected to the lower edge of the outer side wall, and each of the recesses extends longitudinally from its lower edge to a spaced distance from its upper edge; c. positioning the socket recesses 33 on the inner wall 40 of the socket in alignment with the engaged plugs 14 disposed along the recesses of the outer wall 8 of the head 3 of the screw 1; d. bringing together the cylindrical head 3 of the screw 1 with the plugs 14 engaged thereto and the socket, permitting the engaged plugs 14 to be disposed in the socket recesses 33 disposed longitudinally along the inner wall 40 of the socket; e. positioning the threaded end of the shank of the screw 1 through a bore having a countersunk borehole 30 of sufficient diameter to accommodate the socket body 6 and of axial length greater than the length of the recesses extending along the outer wall 8 of the generally cylindrical head 3 of the screw 1; f. driving the screw 1 into threaded engagement with a threaded bore 44 of a base 42, thereby securing the screw 1 and cover plate 28 to the base 42; g. axially withdrawing the socket of the wrench 2 from the countersunk borehole 30 of the cover plate 28, allowing the engaged plugs 14 to remain engaged to the recesses 5 of the head 3 of the screw 1; and h. freeing the moveable plugs 14 from the recesses 5 of the head 3 of the screw 1 and withdrawing the moveable plugs 14 of the wrench 2 from the countersunk borehole 30 of the cover plate 28, thereby disengaging the wrench 2 from the screw 1.

Another preferred embodiment of the method of the present invention comprises the following steps: a. moving each of a plurality of moveable plugs 14 of a wrench 2 having a socket with an inner cylindrical wall that has a corresponding number of socket recesses 33 disposed longitudinally, to a position in which the movable plugs 14 are disposed outside of the socket; b. engaging each of the movable plugs disposed outside of the socket to a recess 5 extending longitudinally along an outer cylindrical wall of a generally cylindrical head 3 of a screw 1 that has a threaded shank; c. moving the engaged plugs and the cylindrical head 3 of the screw 1 into the socket in a manner that permits the movable plugs to engage the socket recesses 33 disposed longitudinally along the inner cylindrical wall of the socket; d. positioning the threaded end of the shank of the screw 1 through a bore having a counter sunk borehole disposed in an exposed surface of a cover plate 28 and into pre-engagement contact with a threaded hole in a base 42; e. driving the screw 1 into threaded engagement with the base 42, thereby securing the screw 1 and cover plate 28 to the base 42; and f. axially withdrawing the plugs and socket of the wrench 2 from the counter sunk borehole of the cover plate 28, thereby disengaging the wrench 2 from the screw 1.

One example of the use of the theft resistant fastener of this invention is to secure a cover plate over an opening in a wall that is to be kept covered for security purposes. This may be, for instance, a cover plate over an aperture in the wall of a hollow metal post that supports a street light at its top end. It is important that the electrical equipment and circuitry within the interior of the hollow pole not be stolen or otherwise tampered with, and a theft resistant cover is very valuable in preserving the security of the system.

FIG. 9 provides a front elevation view of a portion of the fastener of this invention used in this way. (The movable plugs that are an essential part of the fastener, such as plugs 14 shown in FIGS. 1 and 7, are omitted for clarity from FIGS. 10 and 11.) FIGS. 9–11 show a fragmentary portion of a substantially cylindrical wall 50 of a lamp post that contains equipment and circuitry in its interior. Aperture 52 in the wall, which has a given shape and area, provides the access from the exterior that may be necessary from time to time for maintenance purposes.

In the embodiment shown, cover plate 54 has the general shape of the aperture in the wall. The transverse dimensions of the cover plate measured in all directions are substantially greater than the corresponding transverse dimensions of the aperture. As a result, the aperture is completely covered by the cover plate.

When the cover plate is in its position covering the aperture, it is held centered over the aperture by a positioning ledge that extends for either (1) at least a portion of the perimeter of the cover plate or (2) at least part of the wall portions surrounding the aperture. A complementary protrusion is provided on the other member. In the embodiment of FIGS. 9–11, ledge 55 of cover plate 54 comprises the positioning member, and wall portions 57 adjoining aperture 52 act as a complementary protrusion that engages the ledge with a close fit.

The aperture is covered by cover plate 54, which as already indicated has substantially the same shape as the aperture, but a somewhat larger area. It is preferred that, as in the embodiment shown, the configuration of the outer surface of the portions of the wall surrounding the aperture and the configuration of the inner surface of the outer portions of the cover plate be such that the two members will form a good fit when they are assembled together.

The cover plate is fastened to the wall by theft resistant fasteners 56 and 58 acting in cooperation with retaining bar 60 (to be further described below), which is located within the interior of the lamp post. The illustrated cover plate achieves a complete closing of the aperture, and provides security against theft or tampering with the equipment or circuitry inside the post. (As will be seen, cover plate 54 and retaining bar 60 in FIGS. 9–11 correspond to first member 28 and second member 42, respectively, in FIGS. 1–4 and 7.)

For some applications other than the lamp post under discussion, the necessary security against theft or tampering may be provided by only partial coverage of the aperture. In such cases, it will be sufficient if the cover plate has a maximum transverse dimension that is substantially greater than the smallest transverse dimension 61 of the aperture. This will permit the cover plate to be installed in a position bridging across the aperture and to cover at least a substantial portion of the area of the aperture, which in certain cases may be sufficient even though the aperture is not completely closed.

As best seen in FIG. 10, in the illustrated embodiment there are two boreholes 62 and 64, with countersunk portions 66 and 68, located in cover plate 54 to receive screws 70 and 72, respectively. The countersunk portions have a predetermined depth and a predetermined radius.

Cover plate 54 is held in place by screws 70 and 72, which have threaded shanks 74 and 76, respectively. The heads of the screws are generally cylindrical and are disposed concentrically on the end opposite the threaded end of shanks 74 and 76. The radius of each screw head (for example, radius 72a in FIG. 11) is less than the radius of the countersunk portion (radius 68a in FIG. 11) of the corresponding borehole in cover plate 54 by an amount that is predetermined by the desired thickness of movable plugs 14 (FIGS. 1 and 7).

The top surface 77 of each screw head (like the top surface 18 of screw head 3 in FIGS. 1 and 4) is free of any engageable indentations and free of any engageable protrusions. (The term "engageable" is used in this specification and the accompanying claims to mean engageable with a wrench, screwdriver, pliers or similar tool by which the screw can be turned about its axis.) In the embodiment shown, the top surface of each screw head is flat.

The height 78 of each screw head (see FIG. 10), measured axially above the shank, should not be substantially greater than the depth of the countersunk portions 66 and 68, respectively, of the corresponding borehole in the cover plate. In the embodiment of FIGS. 9–11, the height of each screw head is equal to approximately one-half the depth of each countersunk portion 66 and 68. This position of the top of the screw head makes it extremely difficult for any unauthorized person to attempt to reach down into the space between the screw head and the inner wall of the countersunk portion and somehow engage the recesses in the screw head in order to loosen the screw.

Bottom surfaces 80 and 82 of the heads of screws 70 and 72, respectively, have a generally annular shape. The side wall of each screw head has at least one recess 84 and 86, respectively, each of which extends from the bottom surface of the screw head, with its top end located a spaced distance from the top surface of the screw head. As will be seen, the greater this spaced distance is, the more difficult it will be for any unauthorized person to attempt to reach down into the space surrounding the head of the screw to engage the recesses in the screw head in order to loosen the screw.

In the embodiment of FIGS. 9–11 (as well as the embodiment of FIGS. 1–8), a recess of substantially the same shape and dimensions is contained (but not shown in the drawing) in the screw head side walls diametrically opposite the recesses that are shown in the drawing. If desired, only one recess need be provided in each screw head, or a greater number than two—such as six recesses equally spaced circumferentially—may be included in each screw head. The recesses may be of any suitable shape that permits plugs 14 to move in and out of engagement therewith.

There can be any desired number of boreholes in the cover plate and any desired pattern of such holes. Thus, in some cases in which the apparatus of this invention is to be employed, a single fastener, or several fasteners, may be used in place of the two fasteners designated as 56 and 58 in FIGS. 9 and 10. The retaining bar of the fastener of this invention will in such cases contain only one threaded borehole, or more than two, depending upon the number of fasteners used, but in each case arranged in the same pattern as the boreholes in the cover plate.

In FIGS. 9–11, retaining bar 60 is positioned vertically, and has a length substantially greater than the maximum vertical dimension 88 of aperture 50. Depending upon the degree of closure desired, and the positioning of the retaining bar with respect to the vertical axis of the aperture, the length of the bar may be less, but in every case must be substantially greater than the smallest transverse dimension 61 of the aperture. Retaining bar 60 contains threaded boreholes 90 and 92, equal in number and pattern of distribution to boreholes 62 and 64 in the cover plate, and threaded to receive the threaded ends of shanks 74 and 76 of the fastening screws. Inner face 94 of retaining bar 60 may be a flat surface. It is preferred, however, that it be slightly rounded, to conform to the curvature of inner wall 96 of generally cylindrical wall 52. This is best seen in FIG. 11, which is a cross-section view taken along line 11—11 in FIG. 9.

As will be seen, cover plate 54 and retaining bar 60 correspond to the first and second members 28 and 42, respectively, that are fastened together by the theft resistant fastener of this invention shown in FIG. 7.

The tool for tightening screws 70 and 72 in the threaded boreholes of retaining bar 60 is the wrench shown in FIGS. 1–3, 5, 7 and 8. Wrench 2 has a handle portion—in the embodiment illustrated in the Figures just mentioned, members 20 and 22—with a generally cylindrical socket body 6 secured to the handle portion. The socket body defines socket 32, which has a generally cylindrical inner wall 40. The open end of the socket faces away from the handle portion. Inner wall 40 has at least one recess 33 extending inward into the socket from the open end of the socket.

At least one movable plug 14 is provided, each of which is suitably sized and shaped to engage simultaneously one of said at least one recess (designated 5 in FIGS. 1, 4, 6 and 8, and 84 and 86 in FIG. 10) in the outer wall of the screw head, and one of said at least one recess (designated 33 in FIGS. 5, 7 and 8) on inner wall 40 of the socket, when the screw head is positioned within the socket. As will be seen from FIGS. 1 and 7, in the embodiment shown each movable plug 14 is elongated in shape. In order to avoid having to cut the recesses in the inner wall of the socket body too deep, it is preferred that thickness 98 of plugs 14 be no greater that thickness 98' of the substantially cylindrical wall of socket body 6 (see FIG. 8).

Each plug is suitably sized and shaped to pass between the screw head and the inner wall of the countersunk portion of the boreholes in the first member (for example, member 28 in FIGS. 1–4, 7 and 8, and cover plate 54 in FIGS. 9–11), when (1) the screw is fully seated in one of the threaded boreholes in the second member (member 42 in FIGS. 1–4, 7 and 8, and retaining bar 60 in FIGS. 8–11) and (2) socket body 6 has been removed from the countersunk portion in the first member.

Wrench 2 also includes support member 12 for adjustably securing each of the least one movable plug to socket body 6 to permit the plug to move between a first position in which it is disposed within the socket in simultaneous engagement with the recesses in the screw head side wall and the socket inner wall, and a second position in which the movable plug is disposed outside of the socket. In the embodiment shown, support member 12 is a U-shaped flexible cable. The cable is routed through opening 34 in socket body 6. The proximate end of each branch of the cable is attached to one of the movable plugs, and the distal, U-shaped end is disposed above and outside the socket, manually actuable to move the plugs between their first and second positions. Opening 34 through which the cable is routed keeps the cable operatively connected to the socket body at all times.

Cover plate 54 can be installed in its place on wall 50 shown in FIG. 10, by a series of steps, the first steps being executed solely by hand and the remaining steps being performed utilizing the wrench shown in FIGS. 1–3, 5, 7 and 8. Upper screw 70 can be first inserted through borehole 62 in the cover plate and loosely threaded by hand into threaded borehole 90 in retaining bar 60. Next, the bottom end of the retaining bar can be inserted into aperture 52 and lowered sufficiently to allow the upper end of the bar to be positioned within the aperture. The cover plate can then be held in a vertical position and the retaining bar permitted to move in a pendulum motion about upper screw 70, to position itself so that lower threaded borehole 92 in the bar is in line with lower screw 72. Cover plate 54 can then be moved into its approximate final position within aperture 52, and lower screw 72 loosely threaded by hand into threaded borehole 92 in the retaining bar.

Next, socket body 6 of wrench 2 is positioned over upper screw head 70, with one of recesses 33 on inner wall 40 of the socket aligned with one of recesses 84 in the upper screw head to produce a pair of aligned recesses. As shown in FIGS. 1 and 2, one of movable plugs 14 is then drawn into engagement with the pair of aligned recesses, by pulling upward on cable actuator 4.

With the parts in question assembled as indicated, wrench 2 is turned to tighten the upper screw in the retaining bar. When the screw has been tightened securely in place, wrench socket 6 can be withdrawn, which will permit movable plugs 14 to be withdrawn through the space between the top portion of screw head 70 and the inner wall of the countersunk portion 66 of borehole 62. The tightening of the screw by use of wrench 2 and the removal of the wrench can be repeated for lower screw 72.

The procedure outlined can be reversed to remove lower screw 72, loosen upper screw 70, withdraw the cover plate from aperture 52 a short distance, rotate the retaining bar, and remove the loosely connected cover plate and bar entirely from the aperture.

FIGS. 12–14 illustrate still another embodiment of the apparatus of this invention employed to provide security for the electrical equipment and wiring located in the interior of a hollow lamp post. In this embodiment, post 100 is supported on a hollow pedestal in the form of a four-sided truncated pyramid 102, which in turn rests upon concrete surface 104.

Rectangular aperture 106 in pedestal wall 108 is securely closed by cover plate 110. Ledge 112 extends around the entire perimeter of aperture 106, and peripheral portions 114 of cover plate 110 form a close fit with the ledge along its entire length.

Outer surface 116 of the cover plate and outer surface 118 of pedestal wall 108 lie in the same plane. The coplanar relationship just described, which results from the close fit between ledge 112 extending around aperture 106 and the peripheral portions 114 of the cover plate, is maintained by (1) the tight engagement between inner surface 119 of wall 108 and angled feet 121 and 122 adjacent either end of retaining bar 120, which is disposed in a generally horizontal position adjacent the upper portion of the aperture, and (2) the tight engagement between surface 119 and angled feet 123 and 124 at the bottom of the aperture.

Feet 121 and 122 ensure that, if wall 108 in a particular installation happens to be considerably thinner than shown in FIGS. 13 and 14, the main body of the retaining bar will not come into contact with boss 128 on the cover plate and interfere with the close fit between wall 108 and the cover plate at ledge 112 in the wall and peripheral portions 114 of the cover plate.

Borehole 126 is countersunk at 130. With the cover plate installed in place, screw shank 132 extends through borehole 126 in the cover plate, and screw head 133 is seated in countersunk portion 130. Corresponding members are seen on the right-hand side of FIG. 14.

As seen in FIGS. 13 and 14, the cover plate is installed securely in place when threaded portions 136 and 138 of the two fastening screws are fully threaded into the corresponding threaded boreholes 140 and 142 adjacent either end of retaining bar 120. With the fastening screws in this position, recesses 144 and 146 in the two screw heads are located deep within the countersunk portions of the boreholes in the cover plate.

An apparatus for a theft resistant fastener comprising a wrench 2 with a central axis and having a socket 32 that is defined by an upper surface 32*a* having a peripheral edge and an inner wall 40 having an upper edge connected to the peripheral edge of the upper surface with the inner wall 40 has at least one recess 33 disposed longitudinally. The wrench further comprises movable means for plugging suitably sized and shaped to engage at least one of the at least one recess 33 disposed longitudinally along the inner wall 40. The movable means for plugging comprises at least one elongated rod 212 having a free end 212*a* and an actuated end 212*b* with a plug 214 disposed on the free end 212*a* thereof and means for attaching the at least one elongated rod to the upper surface of the socket.

In a preferred embodiment of the apparatus for a theft resistant fastener, the plug 214 is an integral part of the elongated rod 212 and the elongated rod having a generally uniform cross-section, as shown in FIGS. 18–20 and 22.

In another preferred embodiment of the apparatus for a theft resistant fastener shown in FIGS. 18-19, the elongated rod has a generally uniform cross-section with a notch 213 adjacent to the plug 214 at a spaced distance from the free end 212*a* of the rod 212. The notch 213 is disposed longitudinally along the rod facing the central axis and the notch has a bottom surface 213*a* that is generally parallel to the longitudinal axis of the rod 212, as shown in FIG. 20.

In another preferred embodiment of the apparatus for a theft resistant fastener, the wrench 2 comprises means for actuating the movable means for plugging, wherein the movable means for plugging is movable between a first position (shown in FIGS. 15, 17, 18 and 20), in which the movable means for plugging is disposed within the socket where the movable plug 214 of each of the at least one elongated rod 212 engages one of the at least one recess 33 disposed longitudinally along the inner wall thereof, and a second position (shown in FIGS. 16 and 19), in which the movable plug of each of the at least one elongated rod is disposed outside of the socket.

In an embodiment of the apparatus for a theft resistant fastener, the socket 32 has a socket body 6 having an outer wall 8 with an upper edge and a top 10 with a peripheral edge. The upper edge of the outer wall being connected to the peripheral edge of the top.

As shown in FIG. 18, the wrench of the apparatus for a theft resistant fastener comprises a handle 222 extending axially along the central axis from the top 10 of the socket body 6. The handle has an elongated cylindrical shape with a slot 220 disposed longitudinally along the surface thereof and the means for actuating comprises a collar member 216 with central cylindrical bore 216*c*, as shown in FIG. 23, that is suitably sized and adapted to be slidingly disposed on the cylindrical handle. The collar member having a nub 224 protruding radially inwardly in to the bore. The nub is suitably sized to slide in the slot 220 of the handle to limit rotation of the collar member 216 about the handle 222. Furthermore, the collar member 216 has a proximate end 216*a* and a distal end 216*b*: the proximate end of the collar member is disposed in the direction of the socket 32 and the proximate end 216*a* of the collar member is attached to the actuated end 212*b* of each of the at least one elongated rod 212, as best shown in FIG. 18. The means for actuating further comprises a spring member 218 disposed on the handle between the collar member and the top 10 of the socket body as shown in FIG. 17, whereby the plug is spring biased to the second position.

It will be readily understood by those skilled in the art, that the cylindrical handle 222 with the slot 220 for engagement with the nub 224 in the collar member to limit relative rotation which could adversely distort the elongated rods could be replaced by a non-cylindrically shaped handle and correspondingly shaped collar bore to accomplish the same limitation.

As shown in the drawing, the preferred embodiment of the apparatus for a theft resistant fastener provides for the inner wall 40 of the socket 32 being generally cylindrical.

In another preferred embodiment of the apparatus for a theft resistant fastener, a screw 1 having a shank and a generally cylindrical head 3 with a top surface 18 that is free of any engageable variations disposed concentrically on an end of the shank is provided. The generally cylindrical head has a peripheral edge of the top surface, a bottom surface with a peripheral edge, the bottom surface is disposed proximate to the shank, and an outer side wall with an upper edge and a lower edge. The top surface has its peripheral edge connected to the upper edge of the outer side wall and the bottom surface has its peripheral edge connected to the lower edge of the outer side wall, and the outer side wall has at least one recess 5 extending longitudinally from its lower edge to a spaced distance from its upper edge, the at least one recess 5 being suitably sized and adapted to engage one of the movable plugs 214 of the at least one elongated rod 212 disposed longitudinally therein.

As best shown in FIGS. 19 and 20, the length of the notch 213 of the elongated rod is preferably greater than the spaced distance between the at least one recess 5 of the screw extending longitudinally from the lower edge of the outer side wall and its upper edge, and the distance between the bottom surface 213*a* of the notch and the central axis of the wrench corresponds approximately to the radius of the outer side wall of the cylindrical head of the screw, whereby the cylindrical head of the screw may be disposed in axial alignment with the central axis of the wrench and in radial alignment with each notch of the at least one elongated rod for engagement to the wrench.

The preferred material for the elongated rods and the other elements of the apparatus is stainless steel. The spring member 218 is preferably a coil spring of sufficient force to cause the distal end 216*b* of the collar member 216 to abut the handle extension 20 and return the plugs 214 to within the socket 32. The wrench of the preferred embodiments of the apparatus for a theft resistant fastener may have a socket with a radially disposed set screw to secure the socket to the handle and which upon removing will allow the wrench to be disassembled. While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

My invention resides not in any one of these features per se, but rather in the particular combination of all of them herein disclosed and claimed and it is distinguished from the prior art in this particular combination of all of its structures for the function specified.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed as being new and desired to be protected by Letters Patent of the United States is as follows:

1. Apparatus for at least partially covering an aperture in a wall, said aperture having a given shape and area, with a cover plate that is secured to the wall by a theft resistant fastening, which apparatus comprises:
   a. a cover plate that has:
      (i) a maximum transverse dimension substantially greater than the smallest transverse dimension of said aperture, and
      (ii) at least one countersunk borehole therethrough, the countersunk portion of each of said at least one borehole having a predetermined depth and a predetermined radius;
   b. a retaining bar of a length substantially greater than the smallest transverse dimension of said aperture, said bar having at least one threaded borehole therethrough corresponding in number and pattern of distribution to the boreholes in the cover plate;
   c. at least one screw each of which has a shank threaded to fit one of said at least one threaded borehole in the retaining bar, and a generally cylindrical head disposed concentrically on one end of said shank, said generally cylindrical head having:
      (i) a radius that is less by a predetermined amount than the radius of the countersunk portion of the corresponding borehole in the cover plate,
      (ii) a top surface that is free of any engageable indentations and free of any engageable protrusions,
      (iii) a height, measured axially of the shank, that does not substantially exceed the depth of the countersunk portion of the corresponding borehole in the cover plate,
      (iv) a generally annular bottom surface, and
      (v) a side wall in which there is at least one recess extending from said bottom surface, with the top end of the recess located a spaced distance from the top surface of the head; and
   d. a wrench comprising:
      (i) a handle portion;
      (ii) a generally cylindrical socket body secured to said handle portion, said socket body defining a socket having a generally cylindrical inner wall with the open end of the socket facing away from said handle, said inner wall having at least one recess extending inward into the socket from said open end;
      (iii) at least one movable plug each of which is suitably sized and shaped:
         to engage simultaneously one of said at least one recess in the outer wall of the screw head and one of said at least one recess in the inner wall of the socket, with the screw head positioned within the socket and said recesses aligned with each other, and
         to pass between the head of one of said at least one screw and the wall of the countersunk portion of the corresponding borehole in the cover plate,
         to pass between the head of one of said at least one screw and the wall of the countersunk portion of the corresponding borehole in the cover plate, with the screw head fully seated in said borehole and the socket body removed from said countersunk portion, and
      (iv) a support member that adjustably secures each of said at least one movable plug to the socket body to permit the plug to move between a first position in which it is disposed within the socket in simultaneous engagement with a pair of said aligned recesses in the screw head side wall and the socket inner wall, and a second position in which the movable plug is disposed outside of the socket,
   whereby:
      the threaded shank of one of said at least one screw can be manually inserted through one of said at least one borehole in the cover plate and loosely threaded into the corresponding one of said at least one threaded borehole in the retaining bar,
      the cover plate and retaining bar can be moved into their approximate installed positions,
      the steps described in the two subparagraphs just above can be repeated for any other of said at least one of said screws,
      the socket body of the wrench can be positioned over the head of said one screw, with one of the at least one recess on the inner wall of the socket aligned with one of the at least one recess in the screw head to produce at least one pair of aligned recesses,
      said at least one movable plug can be moved into engagement with said at least one pair of aligned recesses,
      the wrench can be turned to tighten said one screw in the threaded borehole of the retaining bar,
      the wrench socket can be withdrawn from the screw,
      the movable plug or plugs can be withdrawn from engagement with the screw head, and
      the procedure with the wrench can be repeated for any other of said at least one screw in the cover plate,
      the procedure with the wrench can be repeated for any other of said at least one screw in the cover plate, and
      the entire procedure can be reversed when it is desired to unfasten the cover plate and retaining bar and remove them from the aperture.

2. The apparatus of claim 1 in which the height of the screw head, measured axially of the screw shank, is equal approximately to one-half the depth of the countersunk portion of the borehole in the cover plate.

3. The apparatus of claim 1 which the retaining bar is disposed in a generally vertical position to secure the cover plate in place over the aperture.

4. The apparatus of claim 1 in which the outer surface of the cover plate and the outer surface of the portions of the wall surrounding the aperture lie in the same plane.

5. In the apparatus of claim 1, the subcombination of a wrench comprising:
  a. a handle portion;
  b. a generally cylindrical socket body secured to said handle portion, said socket body defining a socket having a generally cylindrical inner wall with the open end of the socket facing away from said handle, said inner wall having at least one recess extending inward into the socket from said open end;
  c. at least one movable plug each of which is suitably sized and shaped:
    (i) to engage simultaneously one of said at least one recess in the outer wall of the screw head and one of said at least one recess in the inner wall of the socket, with the screw head positioned within the socket and said recesses aligned with each other, and
    (ii) to pass between the head of one of said at least one screw and the wall of the countersunk portion of the corresponding borehole in the cover plate, with the screw head fully seated in said borehole and the socket body removed from said countersunk portion, and
  d. a support member that adjustably secures each of said at least one movable plug to the socket body to permit the plug to move between a first position in which it is disposed within the socket in simultaneous engagement with a pair of said aligned recesses in the screw head side wall and the socket inner wall, and a second position in which the movable plug is disposed outside of the socket.

6. The apparatus of claim 1 in which the cover plate has the general shape of the aperture in the wall, and the transverse dimensions of the cover plate measured in all directions are substantially greater than the corresponding transverse dimensions of the aperture, whereby the aperture is completely covered by the cover plate.

7. The apparatus of claim 6 in which:
  a. a positioning ledge extends along one of:
    (i) at least a portion of the perimeter of the cover plate, and
    (ii) at least part of the wall portions surrounding said aperture, and
  b. at least one complementary projection is provided on the other of said two members,
whereby when the cover plate is in position covering the aperture it is held generally centered over the aperture.

8. The apparatus of claim 1 in which each of the recesses in the side wall of the at least one screw head and in the inner side wall of the socket body has the form of a straight groove disposed parallel to the longitudinal axis of the screw head and of the socket body, respectively, and each of the recesses is of uniform depth throughout its length.

9. The apparatus of claim 8 which includes two recesses in the side wall of each screw head and two recesses in the inner side wall of the socket body.

10. The apparatus of claim 9 in which the support member adjustably securing said at least one movable plug to the socket body comprises a flexible cable.

11. The apparatus of claim 10 in which the cable is routed through an opening in the socket body, the proximate end of the cable being attached to said at least one movable plug and the distal end being disposed outside the socket, the distal end of the cable being manually actuable to move said at least one plug between said first and second positions.

12. The apparatus of claim 11 in which the opening through which the cable is routed keeps the cable operatively connected to the socket body at all times.

13. The apparatus of claim 12 in which each of said at least one movable plug is elongated, and its thickness is no greater than the thickness of the substantially cylindrical wall of the socket body.

14. The apparatus of claim 1 in which the retaining bar is disposed in a generally horizontal position to secure the cover plate in place over the aperture.

15. The apparatus of claim 14 in which the retaining bar is positioned adjacent the upper portion of the cover plate.

16. The apparatus of claim 15 which includes a foot adjacent each end of the retaining bar to space the main portion of the bar inward from the plane of the inner face of the wall.

17. The apparatus of claim 15 in which the cover plate includes at least one angled foot at the bottom of the plate that is configured to grasp the portion of the wall defining the bottom of aperture to secure the bottom of the cover plate in place.

18. Apparatus for at least partially covering an aperture in a wall, said aperture having a given shape and area, with a cover plate that is secured to the wall by a theft resistant fastening, which apparatus comprises:
  a. a cover plate that has:
    (i) a maximum transverse dimension substantially greater than the smallest transverse dimension of said aperture, and
    (ii) two countersunk boreholes therethrough, the countersunk portion of each of said boreholes having a predetermined depth and a predetermined radius;
  b. a retaining bar of a length substantially greater than the smallest transverse dimension of said aperture, said bar having two threaded boreholes therethrough corresponding in number and pattern of distribution to the boreholes in the cover plate;
  c. at least one screw each of which has a shank threaded to fit one of said two threaded boreholes in the retaining bar, and a generally cylindrical head disposed concentrically on one end of said shank, said generally cylindrical head having:
    (i) a radius that is less by a predetermined amount than the radius of the countersunk portion of the corresponding borehole in the cover plate,
    (ii) a top surface that is free of any engageable indentations and free of any engageable protrusions,
    (iii) a height, measured axially of the shank, that does not substantially exceed the depth of the countersunk portion of the corresponding borehole in the cover plate,
    (iv) a generally annular bottom surface, and
    (v) a side wall in which there is at least one recess extending from said bottom surface, with the top end of the recess located a spaced distance from the top surface of the head; and
  d. a wrench comprising:
    (i) a handle portion;
    (ii) a generally cylindrical socket body secured to said handle portion, said socket body defining a socket having a generally cylindrical inner wall with the open end of the socket facing away from said handle, said inner wall having at least one recess extending inward into the socket from said open end;
    (iii) at least one movable plug each of which is suitably sized and shaped:
      to engage simultaneously one of said at least one recess in the outer wall of the screw head and one of said at least one recess in the inner wall of the socket, with the screw head positioned within the socket and said recesses aligned with each other, and to pass between the head of one of said at least one screw and the wall of the countersunk portion of the corresponding borehole in the cover plate, to pass between the head of one of said at least one screw and the wall of the countersunk portion of the corresponding borehole in the cover plate, with the screw head fully seated in said borehole and the socket body removed from said countersunk portion, and (iv) a support member that adjustable secures each of said at least one movable plug to the socket body to permit the plug to move between a first position in which it is disposed within the socket in simultaneous engagement with a pair of said aligned recesses in the screw head side wall and the socket inner wall, and a second position in which the movable plug is disposed outside of the socket, whereby:

the threaded shank of one of said at least one screw can be manually inserted through one of said at least one borehole in the cover plate and loosely threaded into the corresponding one of said at least one threaded borehole in the retaining bar, the cover plate and retaining bar can be moved into their approximate installed positions, the steps described in the two subparagraphs lust above can be repeated for any other of said at least one of said screws, the socket body of the wrench can be positioned over the head of said one screw, with one of the at least one recess on the inner wall of the socket aligned with one of the at least one recess in the screw head to produce at least one pair of aligned recesses, said at least one movable plug can be moved into engagement with said at least one pair of aligned recesses, the wrench can be turned to tighten said one screw in the threaded borehole of the retaining bar, the wrench socket can be withdrawn from the screw, the movable plug or plugs can be withdrawn from engagement with the screw head, and the procedure with the wrench can be repeated for any other of said at least one screw in the cover plate, the procedure with the wrench can be repeated for any other of said at least one screw in the cover plate, and the entire procedure can be reversed when it is desired to unfasten the cover plate and retaining bar and remove them from the aperture.

* * * * *